United States Patent
Burkhart et al.

(10) Patent No.: US 7,717,132 B2
(45) Date of Patent: May 18, 2010

(54) HYDRAULIC VALVE ACTUATED BY PIEZOELECTRIC EFFECT

(75) Inventors: Robert O. Burkhart, Novi, MI (US); Gregory M. Pietron, Canton, MI (US); Yuji Fujii, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 902 days.

(21) Appl. No.: 11/487,661

(22) Filed: Jul. 17, 2006

(65) Prior Publication Data

US 2008/0011371 A1 Jan. 17, 2008

(51) Int. Cl.
 F15B 13/044 (2006.01)
 H02N 2/06 (2006.01)
 F16K 31/02 (2006.01)

(52) U.S. Cl. ............... 137/625.65; 251/129.06; 310/315; 310/317

(58) Field of Classification Search ............ 137/625.65; 251/129.06; 310/315, 317; 331/116, 116 R
See application file for complete search history.

(56) References Cited

U.S. PATENT DOCUMENTS

| | | | | | |
|---|---|---|---|---|---|
| 3,349,348 | A | * | 10/1967 | Ice | 310/315 |
| 3,703,228 | A | | 11/1972 | Chana | |
| 4,176,822 | A | * | 12/1979 | Chadwick | 251/129.06 |
| 4,456,892 | A | * | 6/1984 | Vandergraaf | 310/315 |
| 4,705,323 | A | | 11/1987 | Imoto et al. | |
| 4,762,300 | A | * | 8/1988 | Inagaki et al. | 251/129.06 |
| 4,971,290 | A | * | 11/1990 | Dahlmann | 251/129.06 |
| 4,983,876 | A | | 1/1991 | Nakamura et al. | |
| 4,995,587 | A | * | 2/1991 | Alexius | 251/129.06 |
| 5,053,692 | A | * | 10/1991 | Craddock | 310/315 |
| 5,133,439 | A | | 7/1992 | Shellhause | |
| 5,417,142 | A | * | 5/1995 | Lohmann | 251/129.06 |
| 5,505,287 | A | | 4/1996 | Asatsuke et al. | |
| 5,645,143 | A | | 7/1997 | Mohr et al. | |
| 5,944,159 | A | | 8/1999 | Schneider et al. | |
| 6,170,526 | B1 | * | 1/2001 | O'Neill | 251/129.06 |
| 6,298,969 | B1 | | 10/2001 | Nagler et al. | |
| 6,454,239 | B1 | * | 9/2002 | Boecking | 251/129.06 |
| 6,889,811 | B2 | | 5/2005 | Ebert et al. | |
| 2003/0107013 | A1 | * | 6/2003 | Pappo et al. | 251/129.06 |
| 2003/0127617 | A1 | * | 7/2003 | Kegel | 251/129.06 |

FOREIGN PATENT DOCUMENTS

DE  4309901  9/1994

* cited by examiner

*Primary Examiner*—John Rivell
(74) *Attorney, Agent, or Firm*—David B. Kelley; MacMillan, Sobanski & Todd, LLC

(57) ABSTRACT

A valve-actuator for a hydraulic valve includes a valve chamber, ports spaced mutually and opening into the chamber, a spool axially located in the chamber for opening and closing hydraulic connections between at least two of the ports as the spool moves axially in the chamber. An actuator includes a housing having mutually spaced surfaces, and a piezoelectric element located in the housing between the surfaces, the element expanding and contracting in response to an electric signal applied to the element. A temperature compensation and motion damping circuit comprising feedback resistors and a thermistor. The spool moves axially in the chamber in response to expansion and contraction of the element.

6 Claims, 3 Drawing Sheets

HYDRAULIC VALVE ACTUATED BY PIEZOELECTRIC EFFECT

BACKGROUND OF THE INVENTION

The preferred embodiment relates generally to an apparatus for actuating a hydraulic valve spool that moves in a chamber to control a hydraulic function produced by the valve. More particularly, it pertains to regulating the magnitude of fluid pressure at an outlet port of the valve using piezoelectric actuation of the valve spool and stabilizing the valve with an electrical feedback circuit.

Hydraulic valves include a chamber, a spool formed with control lands, which open and closed inlet and outlet ports that communicate mutually through the chamber as the spool moves. Various techniques are used to develop forces that are applied to the spool to determine its position in the chamber including forces produced by springs, hydraulic pressure on the lands, and forces produced by an electromechanical actuator acting on the spool.

In the hydraulic systems of automatic transmissions for motor vehicles, pressure regulating valves typically use magnetic solenoids to control the position of the valve spool in its control chamber. The electronic driver circuit receives an electrical command signal produced by a powertrain control unit. In response to the command signal, electric current is applied to the coil of the solenoid to force the spool to a desired position in its chamber where the desired valve function is produced. But the solenoids of this type require up to 1 Amp of electric current to hold a given hydraulic pressure in the system. This energy consumption causes heating in both the coil and driver circuit. In addition, magnetic solenoids are prone to oscillation, which can adversely affect the control function of the valve.

There is a need, therefore, for an actuator that avoids excessive energy consumption, unnecessary heating, and operates with acceptable stability.

SUMMARY OF THE INVENTION

A valve-actuator for a hydraulic valve includes a valve chamber, ports spaced mutually and opening into the chamber, a spool axially located in the chamber for opening and closing hydraulic connections between at least two of the ports as the spool moves axially in the chamber. An actuator includes a housing having mutually spaced surfaces, and a piezoelectric element or stack located in the housing between the surfaces. The stack expands and contracts in response to an electric signal applied to the element. The spool moves axially in the chamber in response to expansion and contraction of the stack. The stack of piezoelectric elements expands when a voltage is applied and contracts when voltage is removed. A coupling spring, interposed between the stack and the valve spool, allows extra freedom of motion in case the stack's spring rate is excessive.

Whenever the flow component moves against the piezoelectric stack, a current is produced opposing the electronic driver's signal. This induces a feedback voltage in the resistors placed in series with the piezoelectric stack adding to the command signal, thereby providing an automatic damping mechanism for the valve.

Temperature variations cause dimensional changes in the piezoelectric stack. These dimensional changes cause a shift in the regulated pressure. A thermistor located in the force motor assembly, in conjunction with the feedback resistors, allows the voltage across the stack to be controlled with temperature, and it helps null the effect of expansion of the piezoelectric stack. The parallel resistor path lowers the input impedance of the system and decreases its susceptibility to electromagnetic interference.

Conventional designs use an electromagnetic solenoid to provide force needed to move either the spool or a pilot section poppet valve. These electromagnetic solenoids require continuous current of up to 1 Amp to hold a pressure. This energy causes heating in both the coil and driver circuit. The piezoelectric force motor draws current only to change the position of the spool in the chamber. Thereafter, it resembles a reverse biased diode with the high resistance thermistor in parallel. This arrangement reduces the energy consumption and lessens the need for heat dissipation in the driver. The piezoelectric regulator valve with damping resistors has smaller pressure oscillations than a conventional system, which relies on hydraulic damping.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
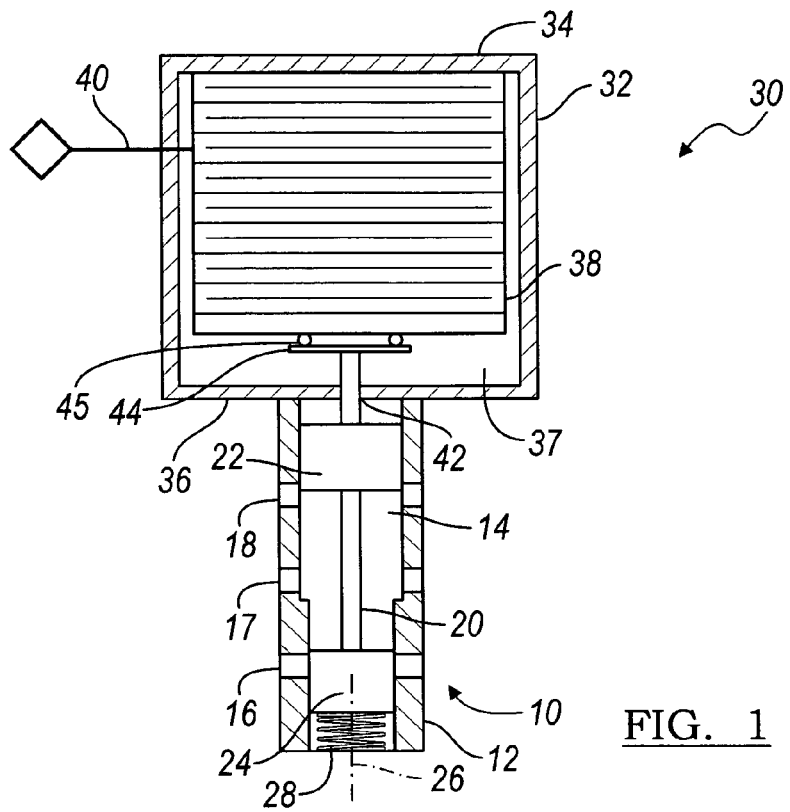
FIG. 1 is a schematic diagram showing a regulator valve controlled by a piezoelectric force actuator.

Referring to FIG. 1, a regulator valve 10 includes a valve body 12; a cylindrical chamber 14 formed in the body; and ports 16, 17, 18 spaced mutually along the wall of the body and opening into the chamber. A valve spool 20, located in the chamber 14, is formed with axially spaced control lands 22, 24, which open and close the ports and hydraulic connections among the ports as the spool moves along the axis 26 of the chamber. At least one port is an inlet port, through which supply flow enters chamber 14. At least one other port is an outlet port 18, through which flow is exhausted to lower the pressure in chamber 14. At least one other port is a control port 17, through which pressure at a regulated magnitude exits the valve through chamber 14, depending, at least in part, on the degree to which the inlet and outlet ports are fully or partially opened by a control land 22, 24.

A compression spring 28, located in chamber 14, applies a spring force to the spool 20 at land 24, where the spring contacts the spool. The force produced by spring 28 continually urges the spool axially toward a piezoelectric variable force actuator 30, located at the opposite axial end of the chamber 14 from the location of the spring 28.

Actuator 30 includes a housing 32 having axially spaced walls 34, 36, a piezoelectric stack 38 located between the walls, electrodes 40, and a connector 42, which extends through the lower wall 36 and contacts the spool 20 at land 22 and a plate 44. The piezoelectric stack 38 is offset from plate 44 by a spacer 45. The actuator housing 32 may be made of a metallic material, and there may be preloaded contact between the walls 34, 36 and the piezoelectric stack 38 when the stack is installed in the housing. The piezoelectric stack 38 is commonly made of a piezoelectric material such as PZT.

The electrodes 40 connect the piezoelectric stack 38 to a power supply (not shown), which is controlled by a transmission controller, a component of a powertrain control unit (not shown). When electrical voltage is applied to the electrodes 40, the piezoelectric stack 38 contracts and expands depending on certain variables, which include the polarity of the voltage, its amplitude, and a duty cycle. The inner surface of wall 34 is a reference surface, on which the adjacent surface of the piezoelectric stack 38 continually bears to resist axial expansion of the stack. The inner surface of wall 36 is spaced from the piezoelectric stack 38 when the stack is installed in the housing 32 and while the stack is de-energized, thereby providing a clearance space 37, into which the stack expands when it is energized. Expansion of the piezoelectric stack 38 is transmitted by connector 42 to the valve spool 20, causing the spool to move along axis 26 away from actuator 30. Contraction of the piezoelectric stack 38 allows the force of spring 28 to move spool 20 along axis 26 toward actuator 30.

Movement of the spool 20 in response to a duty cycle applied to electrode 40, causes the control lands to open and close hydraulic interconnections among the ports 16-18, thereby modulating pressure at a control port of the valve. Thus, by controlling the voltage level of the power supply and modulating its frequency through the powertrain control unit, the position of the spool and the magnitude of pressure exiting the valve 10 at a control port 17 can be accurately controlled, achieving the desired magnitude of pressure in at least a portion of the hydraulic system of the transmission. The electric power requirement varies depending on the specification of the piezoelectric stack 38, operating conditions, and the duty cycle.

Figure 2:
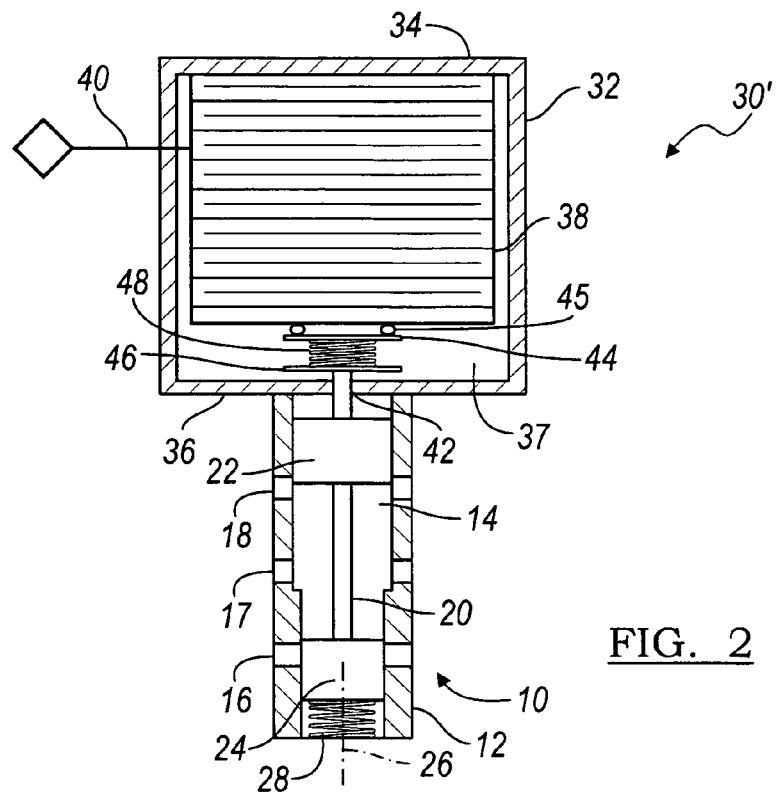
FIG. 2 is a schematic diagram showing an alternate embodiment of the regulator valve and piezoelectric force actuator of FIG. 1.

FIG. 2 illustrates an alternate embodiment, in which connector 42 contacts a plate 46, and a coupling spring 48, supported on plate 46, contacts the lower surface of the piezoelectric stack 38, thereby maintaining a resilient connection between spool 20 and stack 38.

Figure 3:
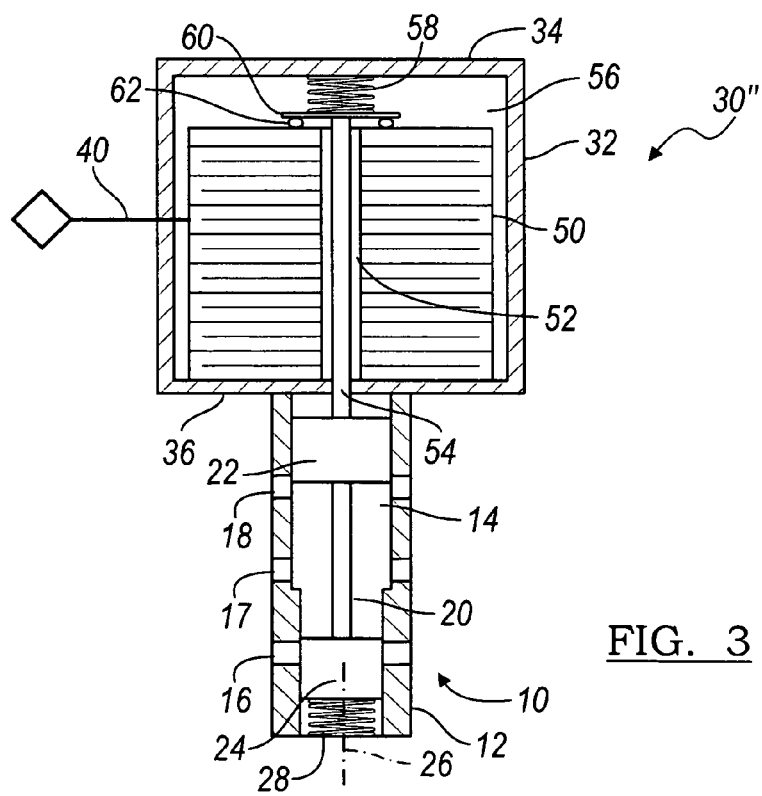
FIG. 3 is a schematic diagram showing an alternate embodiment of the regulator valve and piezoelectric force actuator.

FIG. 3 illustrates an alternate embodiment, in which a piezoelectric stack 50 is formed with a central, axial bore 52. A stem formed on the spool 20, or a connector 54 contacting spool 20 at land 22, extends through the wall 36 and bore 52 and contacts a spring plate 60, which is held in contact with the piezoelectric stack 50 by the force produced by a compression spring 58, fitted between wall 34 and plate 60. The spring force, transmitted to the valve spool 20 through connector 54, continually urges the spool downward away from actuator 30". Spring plate 60 is spaced from the piezoelectric stack 50 by a spacer 62, which is held in contact against the lower surface of the piezoelectric stack by the force of spring 58.

When electrical voltage is applied to the electrodes 40, the piezoelectric stack 50 contracts and expands. The inner surface of wall 36 is a reference surface, on which the adjacent surface of the piezoelectric stack 50 continually bears to resist axial expansion of the stack. The inner surface of wall 34 is spaced from the piezoelectric stack 38 when the stack is installed in the housing 32 and while the stack is deenergized, thereby providing a clearance space 56, into which the stack expands when it is energized. Expansion of the piezoelectric stack 50 compresses spring 58 and takes up its force, which is transmitted by connector 54 to the valve spool 20, causing the spool to move along axis 26 toward the actuator 30". Contraction of the piezoelectric stack 50 allows spring 58 to expand, transferring its force to the spool 20 to move along axis 26 away from actuator 30". By controlling the voltage level of the power supply and modulating its frequency, the position of the spool and the magnitude of pressure of the flow exiting the valve 10 at the control port 17 are controlled.

The coupling spring 58 interposed between the valve body 12 and spool 20 maintains contact between the spool 20 and stack 50 through the connector 54.

Figure 4:
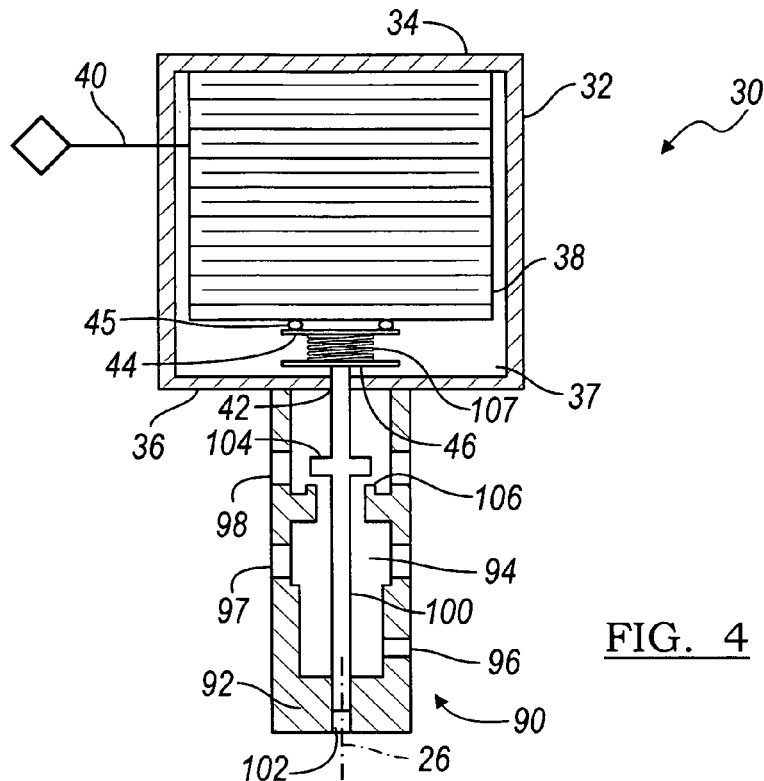
FIG. 4 is a schematic diagram showing a bleed type valve controlled by a piezoelectric force actuator.

FIG. 4 illustrates a bleed type valve 90, which includes a valve body 12; a cylindrical chamber 94 formed in the body; a fluid supply orifice 96; control port 97, and an exhaust port 98, spaced mutually along the wall of the body and opening into the chamber. A valve spool 100, located in the chamber 14 may be guided for axial movement along axis 26 by a cylindrical bore 102 formed in the valve body 92. Spool 100 extends through wall 36 into housing 32 of actuator 30 and is formed with a land 104. Located within chamber 94 and formed on the valve body 92, is a seat 106. When land 104 contacts seat 106, hydraulic connection between the lower volume of chamber 94 where the supply orifice 96 and the control port 97 are located and the upper volume of the chamber where the exhaust port 98 is located is closed. Those hydraulic connections are opened and closed as spool 100 moves in response to expansion and contraction of the piezoelectric stack 38.

The piezoelectric stack 38 is offset from spool 100 by spacer 45, a plate 44 between the lower surface of the stack 38, the coupling spring 58, a second plate 44, and the end of spool 100. When land 104 is seated, a pressure differential can develop across the land 104 due there being a greater pressure in chamber 94 below land 104 than above the land. The pressure differential tends to open the valve 90 by unseating the land. When the spool is unseated, fluid entering chamber 94 through supply orifice 96 or port 97 can exit the valve through the exhaust port 98. The pressure differential is regulated by the pressure drops across the supply orifice 96 and the seat 106 to land 104 opening. When voltage is applied to the electrodes 40, the stack 38 expands against the inner surface of wall 34, which expansion applies a force to spool 100 tending to reseat the land 104.

Figure 5:
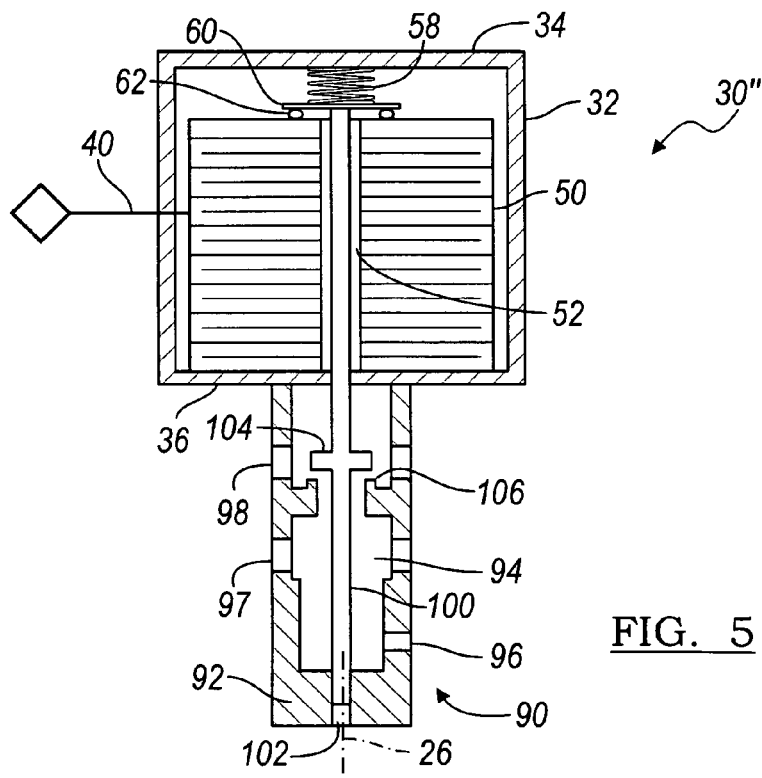
FIG. 5 is a schematic diagram showing an alternate embodiment of the valve controlled by a piezoelectric force actuator illustrated in FIG. 4.

FIG. 5 illustrates an alternate embodiment of the bleed type valve 90 illustrated in FIG. 4. Actuator 30" includes the piezoelectric stack 50, which is formed with a central, axial bore 52. Spool 100 or a connector extends through the bore 52 and wall 36 and contacts a spring plate 60, which is held in contact with the piezoelectric stack 50 by the force produced by a compression spring 58, fitted between wall 34 and plate 60. The force of spring 58, transmitted to the valve spool 100, continually urges the spool 100 downward away from actuator 30" and land 104 toward seat 106. Spring plate 60 is spaced from the piezoelectric stack 38 by a spacer 62, which is held in contact with a surface of the piezoelectric stack by the force of spring 58.

When spool 100 is seated, a pressure differential can develop across the land 104 due there being a greater pressure in chamber 94 below land 104 than above the land. The pressure differential tends to open the valve 90 by unseating the land. When the spool is unseated, fluid entering chamber 94 through supply orifice 96 or control port 97 can exit the valve through the exhaust port 98. When a voltage signal is applied to electrode 40, the stack 50 contracts and extends spring 58, which applies a force to spool 100 tending to resist the force due to the pressure differential and reseat land 104 on seat 106.

The current flows until the piezoelectric material 50 expands to a length related to the applied voltage, producing a force on the plate 60 to add to the hydraulic feedback force. The stack 50 pushes plate 60 away from the spool 100 allowing it to move away from the exhaust seat 106, allowing more oil to flow back through the control port 97 to the exhaust seat 106 lowering the pressure in the lower chamber 94 until the pressure on the larger exhaust end of the spool 100 balances the forces of the stack 50 and spring 58.

Figure 6:
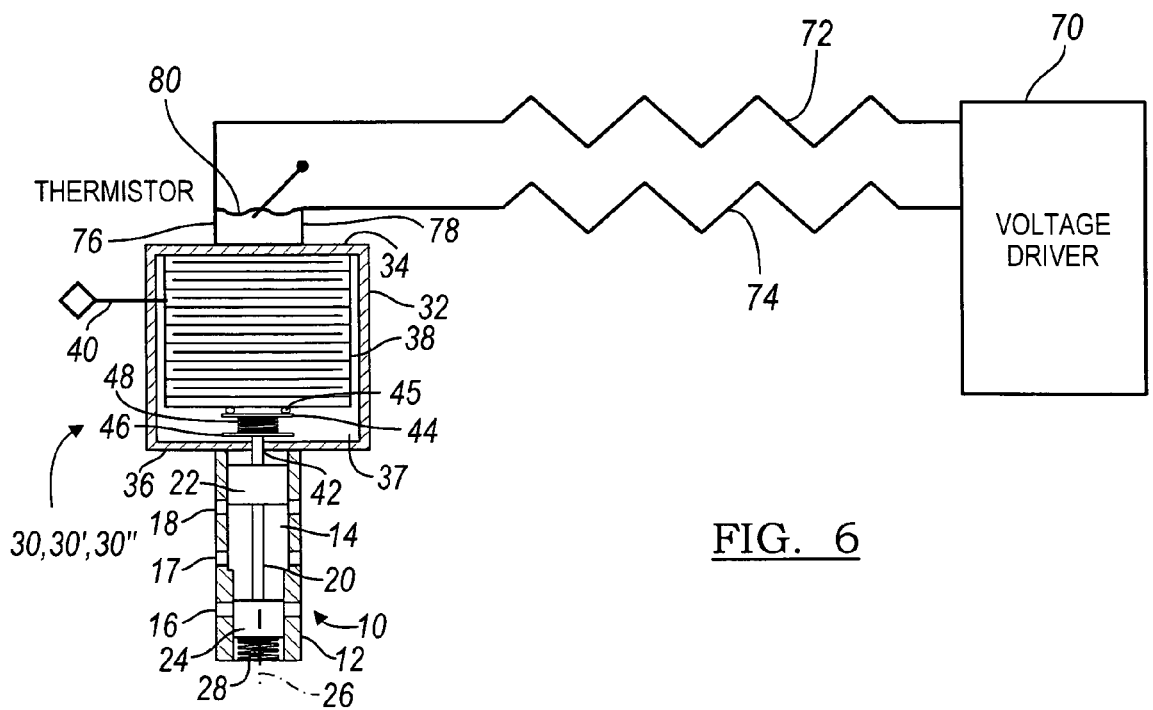
FIG. 6 illustrates a piezoelectric valve and resistor system that provides electronic damping and temperature compensation.

FIG. 6 illustrates the regulator valve 10 controlled by a piezoelectric force motor, such as any of the actuators 30, 30', 30". The position of the spool 20, in the valve is damped electronically and includes temperature compensation. The terminals of a voltage driver 70 are electrically connected by damper resistors 72, 74 to the electrodes 76, 78 of the piezoelectric stack 38. A thermistor 80 is arranged in parallel to the stack 38, between the electrodes 76, 78.

Resistors placed in series with the piezoelectric stack 38 produce a feedback voltage whenever the flow component moves against the piezoelectric stack, thereby providing an automatic damping mechanism for the valve 10. Placing the thermistor 80 in the force motor assembly 30, 30', 30" allows the voltage across the stack to be controlled with temperature and helps null the effect of expansion of the piezoelectric stack. The parallel resistor path lowers the input impedance of the system and decreases its susceptibility to electromagnetic interference.

The piezoelectric force motor 30, 30', 30" draws current only to change the position of the spool 20 in the chamber 14. Thereafter, it resembles a reverse biased diode with the thermistor in parallel. This arrangement reduces the energy consumption and lessens the need for heat dissipation in the driver. The piezoelectric regulator valve with damping resistors 72, 74 has smaller pressure oscillations than a conventional system, which relies solely on hydraulic damping.

The piezoelectric valve of FIG. 6 uses a stack of piezoelectric elements 38 to produce force and displacement for the spool 20. Conventional designs use an electromagnetic solenoid to translate an electrical command into force on the hydraulic regulator valve. The stack of piezoelectric elements 38 expands or contracts when a voltage is applied by the voltage driver circuit 70. A coupling spring 48 can be interposed between the stack 38 and the spool to allow extra freedom of motion in case the stack's spring rate is excessive. Resistors 72, 74 placed in series with the stack 38 produce a feedback voltage whenever the spool 20 moves against the stack 38, providing an automatic damping mechanism for the valve. Placing a thermistor 80 on or in the housing 32 will allow the voltage across the stack 38 to be controlled with temperature and help null out the effect of expansion of the stack 38. The parallel resistor path will lower the input impedance of the system, decreasing the susceptibility of the system to electromagnetic interference.

In accordance with the provisions of the patent statutes, the preferred embodiment has been described. However, it should be noted that the alternate embodiments can be practiced otherwise than as specifically illustrated and described.

What is claimed is:

1. A valve-actuator for controlling a hydraulic function produced by the valve, comprising:
    a valve including a chamber, ports spaced mutually and opening into the chamber, a spool axially located in the chamber for opening and closing hydraulic connections between at least two of the ports as the spool moves axially in the chamber;
    an actuator including a housing including mutually spaced surfaces, a piezoelectric element located in the housing between the surfaces, the element expanding and contracting in response to a variable electric voltage signal applied to and the element, the spool moving axially in the chamber in response to said expansion and contraction of the element;
    a voltage driver including first and second terminals;
    an electrode electrically connected to the element, including a third terminal connected to the first terminal, and a fourth terminal connected to the second terminal; and
    a first resistor connected in series with the first and third terminals; and
    a second resistor connected in series with the second and fourth terminals.

2. The valve-actuator of claim 1, further comprising:
    a spring located in the chamber, contacting the spool and producing a force that continually urges the spool toward the element.

3. The valve-actuator of claim 1, wherein the element continually contacts a first surface of said housing and is spaced axially from a second surface of said housing, the valve-actuator further comprising:
    a first spring located in the chamber, contacting the spool, and producing a force that continually urges the spool and element toward said first surface.

4. The valve-actuator of claim 1, wherein the element continually contacts a first surface of said housing and is spaced axially from a second surface of said housing, the valve-actuator further comprising:
    a first spring located in the chamber, contacting the spool, and producing a force that continually urges the spool and element toward said first surface; and
    a second spring located in the housing, contacting the element, and producing a force that continually urges the spool away from the element and urges the element toward said first surface.

5. The valve-actuator of claim 1, wherein the element continually contacts a first surface of said housing and is spaced axially from a second surface of said housing, the valve-actuator further comprising:
    a first spring located in the chamber, contacting the spool, and producing a force that continually urges the spool and element toward said second surface; and
    a second spring located in the housing, contacting the second surface, and producing a force that continually urges the spool away from the element and urges the element toward the first surface.

6. The valve-actuator of claim 1, further comprising:
    a thermistor connected in parallel between the third and fourth terminals.

* * * * *